US008446601B2

(12) United States Patent
Tsuchida

(10) Patent No.: US 8,446,601 B2
(45) Date of Patent: May 21, 2013

(54) CONTROL DEVICE AND IMAGE FORMING APPARATUS

(75) Inventor: Eiji Tsuchida, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 1064 days.

(21) Appl. No.: 12/341,119

(22) Filed: Dec. 22, 2008

(65) Prior Publication Data

US 2009/0168097 A1 Jul. 2, 2009

(30) Foreign Application Priority Data

Dec. 26, 2007 (JP) ................................ 2007-333957
Jun. 17, 2008 (JP) ................................ 2008-157882

(51) Int. Cl.
*G06F 3/12* (2006.01)
*B41J 2/145* (2006.01)

(52) U.S. Cl.
USPC .......... 358/1.13; 358/1.9; 358/1.15; 358/409; 358/410; 358/411; 358/412; 358/413; 347/41; 347/57; 347/144; 347/175; 347/231; 347/234; 347/248; 347/249; 347/250; 347/251; 347/252; 345/213

(58) Field of Classification Search
None
See application file for complete search history.

(56) References Cited

U.S. PATENT DOCUMENTS 5,029,017 A * 7/1991 Abe et al. ...................... 358/451
5,283,662 A * 2/1994 Nakajima ..................... 358/409
6,072,593 A * 6/2000 Ooshita .......................... 358/1.9
6,608,703 B1 * 8/2003 Toriyama et al. ............. 358/410
2005/0206719 A1 * 9/2005 Komiya et al. ............... 347/248
2006/0209170 A1 * 9/2006 Nihei ............................ 347/247
2006/0291880 A1 * 12/2006 Kitora ............................ 399/27

FOREIGN PATENT DOCUMENTS

JP 64-20146 1/1989
JP 07-156443 A 6/1995
JP 07156443 A * 6/1995
JP 2000-218861 8/2000
JP 2000-301766 10/2000
JP 2002-200795 7/2002

OTHER PUBLICATIONS

Shimizu, Satoshi; JP 07156443A (Machine Translation of the furnished JP reference), Jun. 20, 1995.*
Japanese Office Action for Japanese Patent Application No. 2008-157882 dated Oct. 23, 2012.

* cited by examiner

*Primary Examiner* — Miya J Cato
(74) *Attorney, Agent, or Firm* — Oblon, Spivak, McClelland, Maier & Neustadt, L.L.P.

(57) ABSTRACT

A disclosed control device includes a first unit configured to generate image data of multiple images to be superposed one on the other to form a single image and transmit the image data. The second control unit transmits to the first control unit a horizontal sync reference signal for achieving synchronization of the images in a horizontal direction. Based on the horizontal sync reference signal, the first control unit transmits to the second control unit a transfer clock signal that indicates transmission timing of the image data and an effective area signal that indicates an effective area of the image data. The first control unit asserts the effective area signal for an effective-area-signal assertion period that occurs between two consecutive reference-signal assertion periods during which the horizontal sync reference signal is asserted.

16 Claims, 14 Drawing Sheets

CONTROL DEVICE AND IMAGE FORMING APPARATUS

BACKGROUND OF THE INVENTION

1. Field of the Invention

The present invention is directed to a control device for controlling timing of transferring multicolor image data and an image forming apparatus having the control device. Examples of the image forming apparatus are fax machines, color printers, color copiers, and multifunction peripherals providing multiple functions of such machines.

2. Description of the Related Art

Conventionally, there are image forming apparatuses that produce a high quality image with no image shift by using a lesser number of horizontal sync reference signal lines than the number of types of image data handled (for example, see Patent Document 1).

There are also image forming apparatuses in which image data of respective colors of yellow, magenta, cyan and black are sequentially supplied to an image formation control unit at such a timing that, in order to form a single multicolor image, images of the respective colors are superposed one on top of the other by plural image forming units based on a vertical sync signal input from a single vertical sync signal line (e.g. Patent Document 2).

Patent Document 1: Japanese Laid-open Patent Application Publication No. 2000-301766

Patent Document 2: Japanese Laid-open Patent Application Publication No. 2000-218861

However, the above-described conventional image forming apparatuses leave the problem that the timing of transferring image data is affected by noise due to not being able to readily determine an effective area of the image data of each color.

SUMMARY OF THE INVENTION

In view of the above-mentioned conventional problem, the present invention aims at reducing the noise influence on the timing of transferring image data by facilitating the determination of the effective area of the image data, so that a high quality image can be formed.

In order to achieve the above-mentioned purpose, one embodiment of the present invention may be a control device including a first control unit configured to generate image data of multiple images to be superposed one on the other to form a single image and transmit the image data; and a second control unit configured to receive the image data and superpose the images so as to form the single image. The second control unit transmits to the first control unit a horizontal sync reference signal for achieving synchronization of the images in a horizontal direction. Based on the horizontal sync reference signal, the first control unit transmits to the second control unit a transfer clock signal that indicates transmission timing of the image data and an effective area signal that indicates an effective area of the image data. The first control unit asserts the effective area signal in such a manner that an effective-area-signal assertion period during which the effective area signal is asserted occurs between two consecutive reference-signal assertion periods during which the horizontal sync reference signal is asserted.

In order to achieve the above-mentioned purpose, another embodiment of the present invention may be an image forming apparatus including the above-described control device.

DETAILED DESCRIPTION OF THE PREFERRED EMBODIMENTS

Embodiments that describe the best mode for carrying out the present invention are explained next with reference to the drawings.

Figure 1:
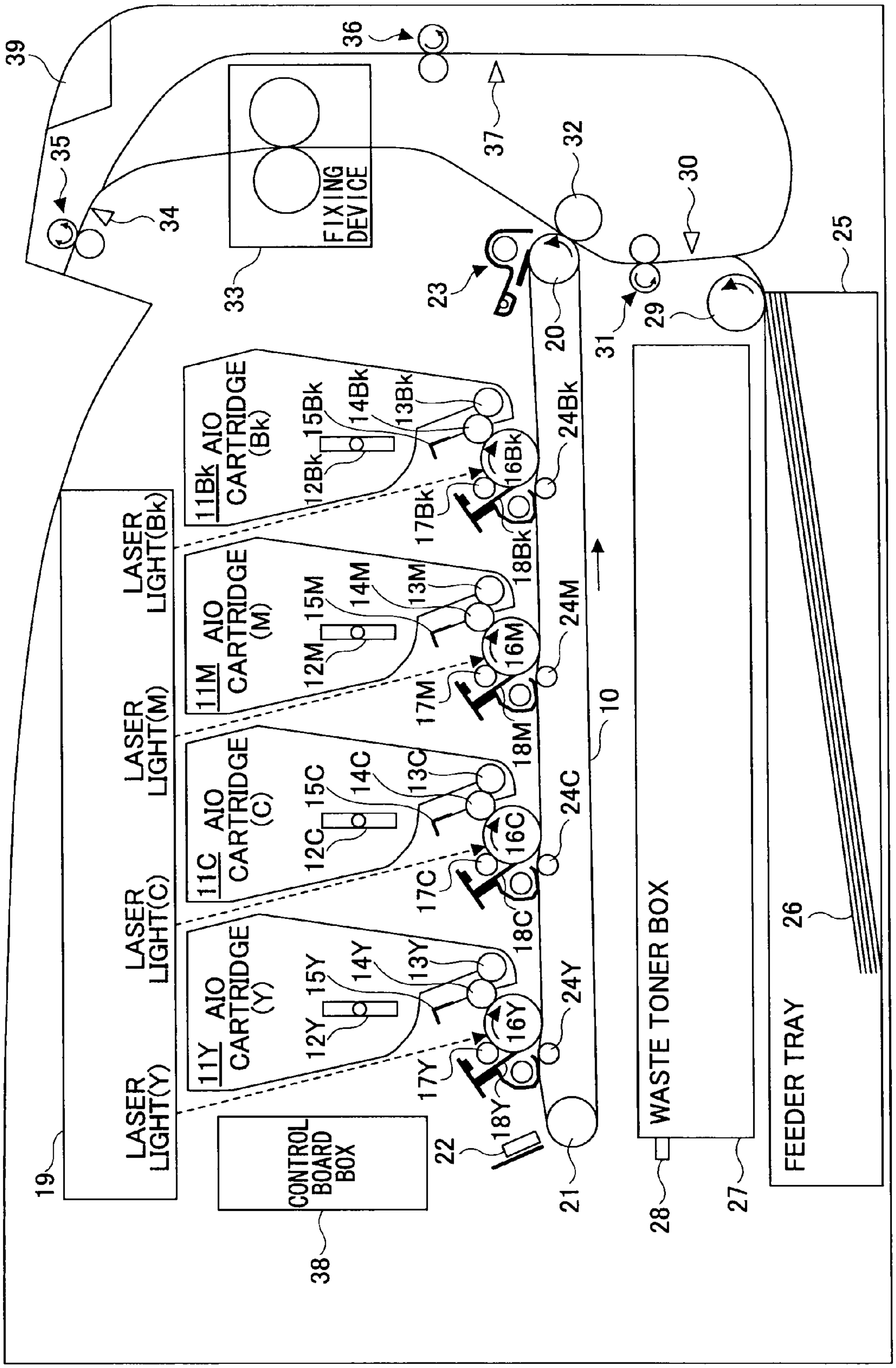
FIG. 1 is a cut-open view showing an overall structure of an image forming apparatus according to an embodiment of the present invention.

FIG. 1 is a cut-open view showing an overall structure of an image forming apparatus according to an embodiment of the present invention.

As shown in FIG. 1, the image forming apparatus of the present embodiment is a so-called tandem color image forming apparatus including all-in-one (AIO) cartridges (electrophotographic process units) 11Bk, 11M, 11C and 11Y for black (Bk), magenta (M), cyan (C) and yellow (Y), respectively, aligned along a transfer belt 10.

The transfer belt 10 rotates in the counterclockwise direction (arrow direction) in FIG. 1. From the upstream side toward the downstream side in the rotational direction, the AIO cartridges 11Bk, 11M, 11C and 11Y are sequentially arranged.

The AOI cartridges 11Bk, 11M, 11C and 11Y differ only in forming toner images in different colors, and they have the same internal structure.

The AIO cartridge 11Bk forms a black image; the AIO cartridge 11M, magenta; the AIO cartridge 11C, cyan; and the AIO cartridge 11Y, yellow.

The following specifically describes the AIO cartridge 11Bk; however, the same applies to the remaining AIO cartridges 11M, 11C and 11Y. Therefore, structural members of image forming units of the AIO cartridges 11M, 11C and 11Y corresponding to those of an image forming unit of the AIO cartridge 11Bk are indicated using the same referential numerals appended with “M”, “C” and “Y”, respectively, in place of “Bk” in FIG. 1, and their detailed descriptions are omitted.

The transfer belt 10 is an endless belt passing over a secondary transfer driving roller 20 and a transfer belt tension roller 21 driven to rotate.

The secondary transfer driving roller 20 is driven to rotate by a drive motor (not shown). The drive motor, the secondary transfer driving roller 20 and the transfer belt tension roller 21 together function to rotate the transfer belt 10. Reference numeral 22 designates a toner mark (TM) sensor and reference numeral 23 designates a transfer belt cleaner.

The image forming unit of the AIO cartridge 11Bk includes, for example, a paddle 12Bk for agitating toner, a photoreceptor 16Bk serving as a latent image carrier, a charging unit 17Bk disposed on the periphery of the photoreceptor 16Bk, an exposing unit 19, a developing unit 14Bk, a supply roller 13Bk for supplying toner to the developing unit 14Bk, a developing blade 15Bk and a cleaner blade 18Bk.

The exposing unit 19 is configured to emit laser lights Bk, M, C and Y that are exposing lights corresponding to the colors of images formed by the AIO cartridges 11Bk, 11M, 11C and 11Y.

In an image forming process, the peripheral surface of the photoreceptor 16Bk is uniformly charged by the charging unit 17Bk in the dark, and then the laser light Bk emitted from the exposing unit 19 is projected onto the charged surface, so that an electrostatic latent image is formed.

The electrostatic latent image is developed by black toner applied by the developing device 14Bk, and thus made visible on the photoreceptor 16Bk as a toner image.

The toner image is transferred to the transfer belt 10 by a primary transfer roller 24Bk at which the photoreceptor 16Bk comes in contact with the transfer belt 10 (primary transfer position). As a result, a black toner image is formed on the transfer belt 10.

After the toner image is transferred to the transfer belt 10, unnecessary toner remaining on the peripheral surface of the photoreceptor 16Bk is cleaned by the cleaner blade 18Bk. Subsequently, the photoreceptor 16Bk stands ready to the next image forming process.

The waste toner after being collected is sent to a waste toner box 27. The waste toner box 27 is replaced with a new box 27 if a waste toner full detection sensor 28 detects that the waste toner box 27 is full.

The black toner image transferred to the transfer belt 10 by the AIO cartridge 11Bk in the above-described manner is conveyed to the next AIO cartridge 11M as the transfer belt 10 rotates.

In the AIO cartridge 11M, a magenta toner image is formed on a photoreceptor 16M by the same process as in the AIO cartridge 11Bk described above, and the magenta toner image is transferred to the transfer belt 10 in a manner so as to be superposed on the black toner image on the transfer belt 10.

The superposed toner images are then conveyed to the AIO cartridge 11C, and subsequently to the AIO cartridges 11Y. In the AIO cartridges 11C and 11Y, a cyan toner image and a yellow toner image are formed on photoreceptors 16C and 16Y, respectively, by the same process as in the AIO cartridge 11Bk described above, and each toner image is transferred to the transfer belt 10 in a manner so as to be superposed on the previously superposed toner images.

By the above process, a full color image can be formed on the transfer belt 10.

The full color image on the transfer belt 10 is then conveyed to a secondary transfer roller 32.

Note that in the case of printing black only, primary transfer rollers 24M, 24C and 24Y move out of contact with the photoreceptors 16M, 16C and 16Y, respectively, and the above-described image forming process is performed using only structural members for the black image.

Next are described actions of structural members in a paper carrying operation associated with the image forming process. In the paper carrying operation, sheets of paper 26 housed in a feeder tray 25 are sent out sequentially from the top of the stack by a sheet feeding roller 29 driven to rotate in the counterclockwise direction. A resist sensor 30 detects the presence/absence of a sheet of paper 26, and controls the timing to stop the rotation of the sheet feeding roller 29. In this way, a sheet of paper 26 is in standby at the position of resist rollers 31.

The resist rollers 31 are started to rotate at such a timing that the full-color toner image carried on the transfer belt 10 meets the sheet of paper 26 at the secondary transfer roller 32.

At this point, the resist rollers 31 are rotated and the sheet feeding roller 29 is driven to rotate in the counterclockwise direction, so that the sheet of paper 26 is sent out. Subsequently, the resist sensor 30 detects the absence of the sheet of paper 26, and then stops the rotation of the sheet feeding roller 29.

The toner image on the transfer belt 10 is transferred by the secondary transfer roller 32 to the sheet of paper 26 sent out by the resist rollers 31, and then fixed onto the sheet of paper 26 in a fixing device 33 by heat and pressure. Subsequently, the sheet of paper 26 is discharged outside the image forming apparatus by discharge rollers 35 rotating in the opposite directions.

In the case of two-sided printing, immediately after the rear edge of the sheet of paper 26 passes through a discharge sensor 34, the discharge rollers 35 are stopped, and then driven to rotate in the opposite directions to send the sheet of paper 26 to a conveyance path for two-sided image formation provided in the image forming apparatus on the right side of FIG. 1.

The sheet of paper 26 sent to the conveyance path for two-sided image formation is carried again to the resist rollers 31 via two-side rollers 36.

The timing of the sheet of paper 26 passing through the two-side rollers 36 is detected by a two-side sensor 37.

After reaching the resist rollers 31, the sheet of paper 26 is again fed to the secondary transfer roller 32, and a toner image is transferred to the side of the sheet of paper 26 opposite from the side on which an image has already been formed. The newly transferred toner image is then fixed at the fixing device 33 by heat and pressure, and subsequently, the sheet of paper 26 is discharged outside the image forming apparatus by the discharge rollers 35 rotating in the opposite directions.

A control board box 38 provided in the image forming apparatus includes a control unit which performs all control operations, such as control of image data processes and engine control of the image forming apparatus, and control of an operations display unit 39 which allows an operator to make various input operations.

Figure 2:
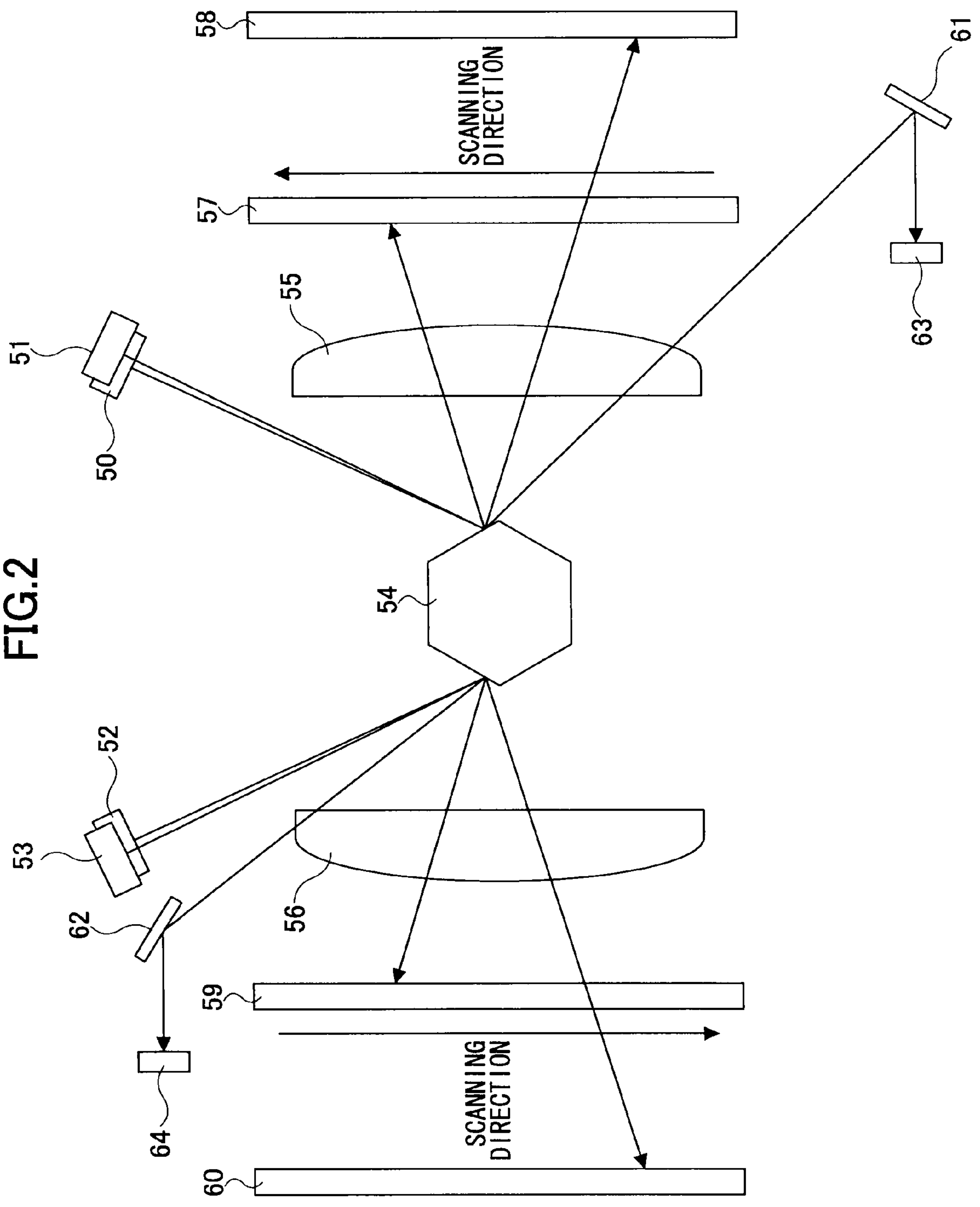
FIG. 2 is a schematic top view showing the inside of an exposing unit of FIG. 1.
Figure 3:
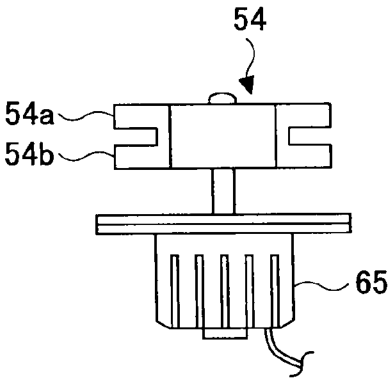
FIG. 3 is a lateral view of a polygon motor and a polygon mirror of FIG. 2.

FIG. 2 is a schematic top view showing the inside of the exposing unit 19 of FIG. 1. FIG. 3 is a side view of a polygon motor and a polygon mirror shown in FIG. 2.

The exposing unit 19 is configured to write image information on the photoreceptors 16 with a collection of points of light by laser raster scanning. There are many laser light sources, such as an He—Ne laser; however, the present embodiment describes the case of using a semiconductor laser as the laser light source.

As shown in FIGS. 2 and 3, a polygon mirror 54 has a regular polygonal shape, and has upper and lower two levels 54*a* and 54*b* of reflection planes. The polygon mirror 54 is rotated by a polygon motor 65 at a constant speed in a constant direction. The speed of rotation is determined by the rotational speed of the photoreceptors 16, the writing speed and the number of mirror planes of the polygon mirror 54.

Laser light emitted from a laser diode (LD(Bk)) unit 50 corresponding to black and an LD(Y) unit 52 corresponding to yellow are incident on the lower level 54*b* of the polygon mirror 54. The incident laser light corresponding to black is deflected by the polygon mirror 54 in rotation, passes through an fθ lens 55, is then reflected back by a first mirror 58 and projected onto the photoreceptor 16Bk. In the same manner, the incident laser light corresponding to yellow is deflected by the polygon mirror 54 in rotation, passes through an fθ lens 56, is then reflected back by a first mirror 60 and projected onto the photoreceptor 16Y.

On the other hand, laser light emitted from an LD(M) unit 51 corresponding to magenta and an LD(C) unit 53 corresponding to cyan are incident on the upper level 54*a* of the polygon mirror 54. The incident laser light corresponding to magenta is deflected by the polygon mirror 54 in rotation, passes through the fθ lens 55, is then reflected back by a first mirror 57 and projected onto the photoreceptor 16M. In the same manner, the incident laser light corresponding to cyan is deflected by the polygon mirror 54 in rotation, passes through the fθ lens 56, is then reflected back by a first mirror 59 and projected onto the photoreceptor 16C.

In addition, according to the present embodiment, a first cylinder mirror 61, a second cylinder mirror 62, a first sync detection sensor 63 and a second sync detection sensor 64 are provided at start positions of image writing in the main scanning direction. Laser light passing through the fθ lens 55/56 is reflected and collected by the first/second cylinder mirror 61/62, and enters the first/second sync detection sensor 63/64.

The first and second sync detection sensors 63 and 64 are configured to generate a start-side sync detection signal XDETP.

Laser light emitted from the LD(Bk) unit 50 enters the first sync detection sensor 63, which then generates the start-side sync detection signal XDETP. With the use of the start-side sync detection signal XDETP, lighting of the LD(Bk) unit 50 and LD(M) unit 51 is controlled.

Alternatively, the first sync detection sensor 63 may generate the start-side sync detection signal XDETP based on laser light emitted from the LD(M) unit 51, and with the use of the start-side sync detection signal XDETP, lighting of the LD(Bk) unit 50 and LD(M) unit 51 may be controlled.

The same applies to the lighting control of the LD(Y) unit 52 and LD(C) unit 53.

According to the start-side sync detection signals XDETP generated based on the laser light entering the first and second sync detection sensors 63 and 64, respectively, the rotational speed of the polygon mirror 54 and each line formed on the respective photoreceptors 16Bk, 16M, 16C and 16Y are synchronized.

By sequentially repeating the above operation, the images of individual lines form a single image as a whole on each photoreceptor 16.

As can be seen from FIG. 2, the LD(Y) unit 52 and LD(C) unit 53 scan in the opposite direction from the scan direction of the LD(Bk) unit 50 and LD(M) unit 51.

Figure 4:
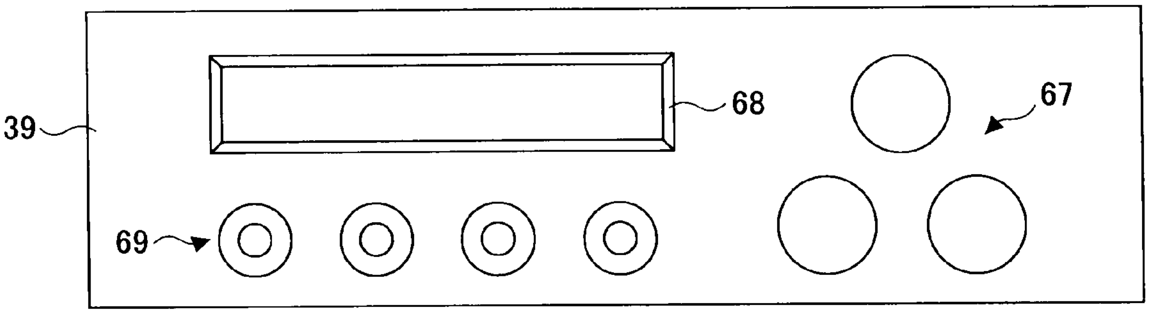
FIG. 4 is a schematic top view of an operations display unit of FIG. 1.

FIG. 4 is a schematic top view of the operation display unit 39 of FIG. 1.

The operations display unit 39 includes, for example, operation input buttons 67 for the user to input various types of operation information; a liquid crystal display screen 68 for displaying various processing screens and information for the user; and LEDs 69 for reporting modes and conditions of the image forming apparatus and warnings to the user.

Figure 5:
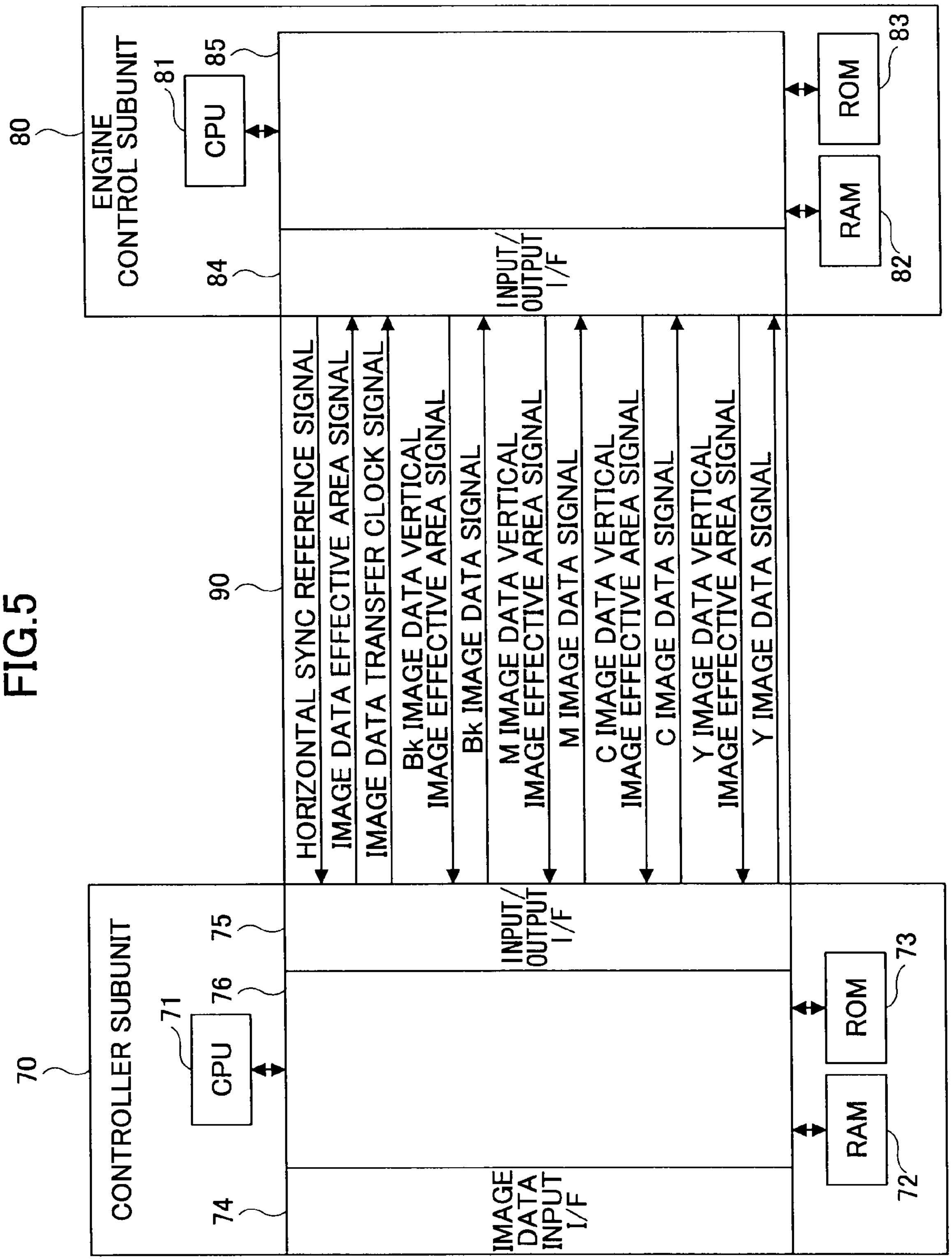
FIG. 5 is a block diagram showing a structure of a control unit provided in a control board box of FIG. 1.

FIG. 5 is a block diagram showing a structure of the control unit provided in the control board box 38 of FIG. 1.

The control unit of the control board box 38 includes a controller subunit 70 and an engine control subunit 80. The controller subunit 70 corresponds to the "first control unit" as defined in the appended claims, which generates image data of respective colors of black, magenta, cyan and yellow for, for example, document data input from an external personal computer (or image data input from a scanner) and transmits the generated image data to the engine control subunit 80. The engine control subunit 80 corresponds to the "second control unit" as defined in the appended claims, which forms a color image by superposing the image data of the respective colors received from the controller subunit 70 and prints the color image on a sheet of paper 26.

The controller subunit 70 configured to process image data of the respective colors and control inputs and outputs includes a CPU 71 for performing various control processes at the time of transmission of the generated image data to the engine control subunit 80; a RAM 72 for temporarily storing the image data and various types of information; a ROM 73 for storing a program for the CPU 71 to execute various control processes; an image data input interface (I/F) 74 for inputting data from outside; an input/output interface (I/F) 75 for controlling the exchange of various signals including image data with the engine control subunit 80; and a bus 76 for exchanging data among the structural members within the controller subunit 70.

Although no illustration is given, the operations display unit 39 is controlled by a serial interface. Data are transmitted to the liquid crystal display screen and LEDs from the CPU 71. The CPU 71 receives various types of input operational data, based on which various controls are subsequently performed.

The engine control subunit 80 includes a CPU 81 for performing various control processes at the time of reception of image data of the respective colors from the controller subunit 70 and printing the image data; a RAM 82 which is used by the CPU 81 as a work area to execute various control processes and temporarily stores the image data; a ROM 83 for storing a program for the CPU 81 to execute various control processes; an input/output interface (I/F) 84 for controlling exchange of various signals including image data with the controller subunit 70; and a bus 85 for exchanging data among the structural members within the engine control subunit 80.

The controller subunit 70 and the engine control subunit 80 are connected by a communication line 90 so as to exchange various types of data.

The communication line 90 is an interface for transmitting image data from the controller subunit 70 to the engine control subunit 80. Signals exchanged between the controller subunit 70 and the engine control subunit 80 include a horizontal sync reference signal for setting timing of transmission and reception of all the other signals; an image data effective area signal; an image data transfer clock signal; a Bk vertical image effective area signal; a Bk image data signal; an M vertical image effective area signal; an M image data signal; a C vertical image effective area signal; a C image data signal; a Y vertical image effective area signal; and a Y image data signal.

Signals transmitted from the controller subunit 70 to the engine control subunit 80 under the control of the CPU 71 are the image data effective area signal, the image data transfer clock signal, the Bk image data signal, the M image data signal, the C image data signal and the Y image data signal.

On the other hand, signals transmitted from the engine control subunit 80 to the controller subunit 70 under the control of the CPU 81 are the horizontal sync reference signal, the Bk vertical image effective area signal, the M vertical image effective area signal, the C vertical image effective area signal and the Y vertical image effective area signal.

Figure 6:
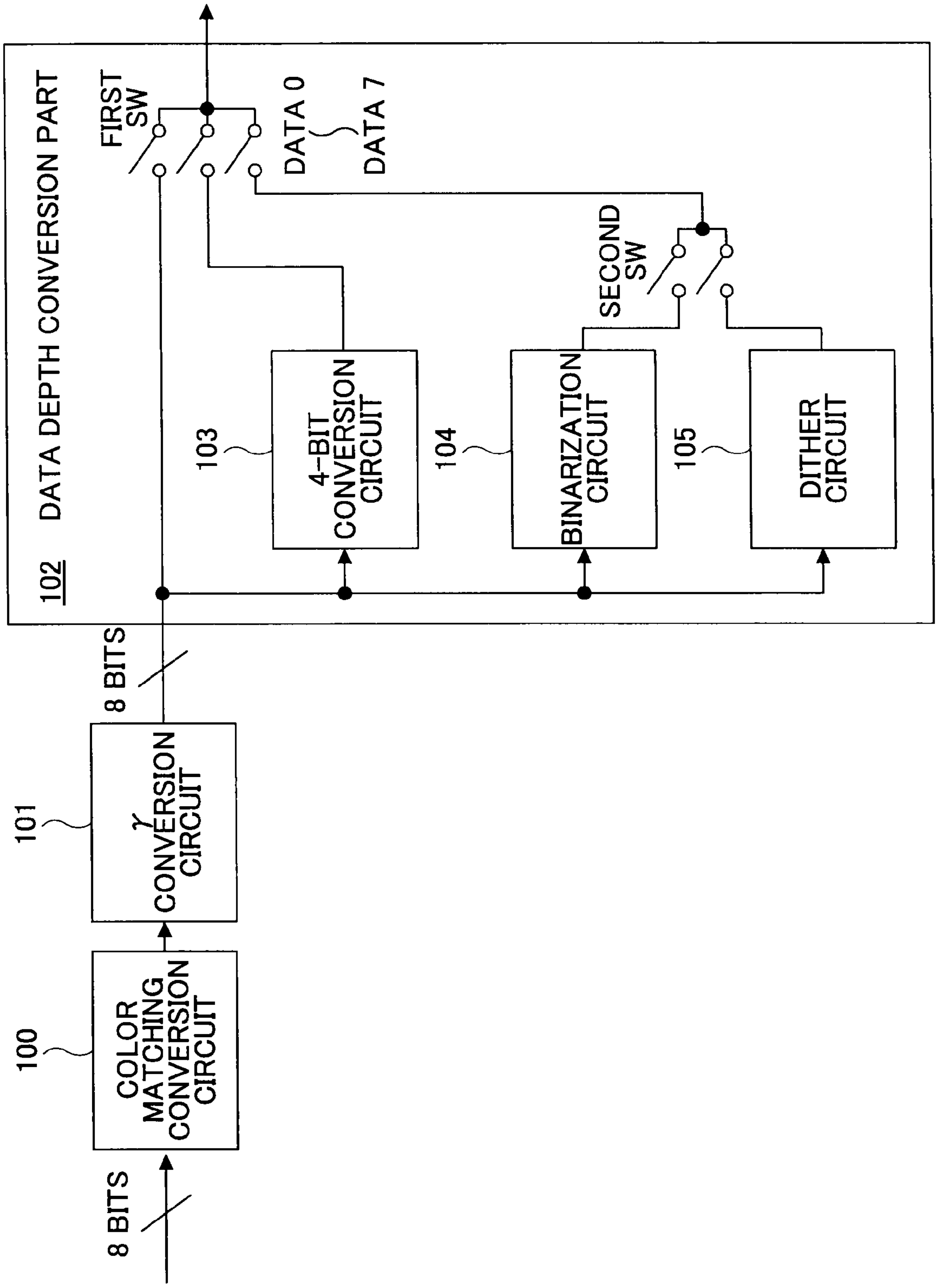
FIG. 6 is a structural block diagram of an image-data processing circuit that is provided in a CPU of a controller subunit of FIG. 5.

FIG. 6 is a structural block diagram of an image-data processing circuit that is provided in the CPU 71 of the controller subunit 70 of FIG. 5.

FIG. 7 illustrates three types of output data among which a data depth conversion part 102 of FIG. 6 performs switching.

An image data signal input to the controller subunit 70 via the image data input I/F 74 is stored in the RAM 72, and subjected to a color matching conversion in a color matching conversion circuit 100 and then transmitted to a γ conversion circuit 101.

The γ conversion circuit 101 converts the image data signal received from the color matching conversion circuit 100 into an image data signal suitable for input-output characteristics of the image forming apparatus, and outputs the converted image data signal to the data depth conversion part 102.

In the data depth conversion part 102, the image data signal output from the γ conversion circuit 101 is converted into predetermined quantization levels.

The data depth conversion part 102 is configured to, using the image data signal output from the γ conversion circuit 101, obtain three different data depths of the image data.

Figure 7A:
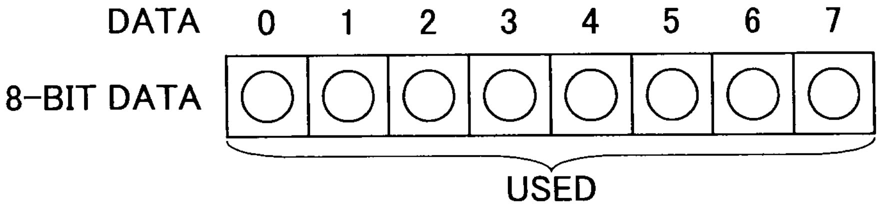
FIG. 7 illustrates three types of output data among which a data depth conversion part of FIG. 6 performs switching.
Figure 7B:
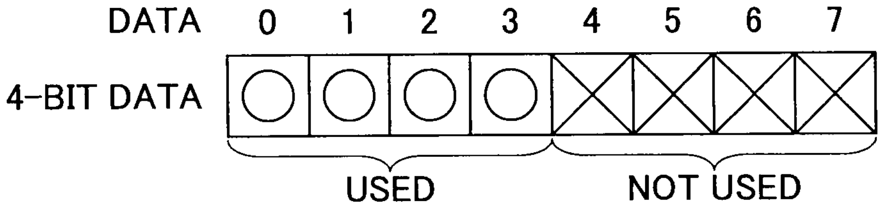
Figure 7C:
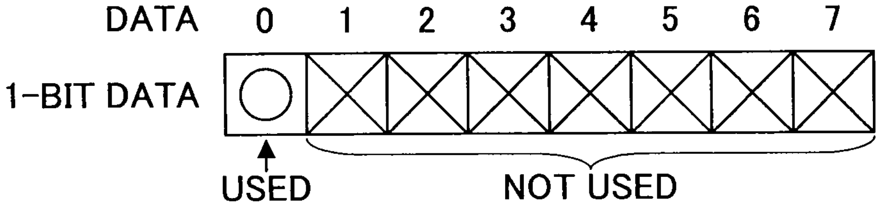

The image data signal output from the γ conversion circuit 101 is 8 bits (see FIG. 7A). A 4-bit conversion circuit 103 converts the image data signal from 8 bits into 4 bits (FIG. 7B). A binarization circuit 104 converts the input multiple-value data of 8 bits into binary data using a predetermined fixed threshold and outputs the converted 1-bit data (FIG. 7C).

A dither circuit 105 outputs 1-bit data (FIG. 7C) converted according to pulse-surface-area modulation.

Subsequently, one of these four types of data is selected by a first switch (first SW) and a second switch (second SW), and output as DATA 0-7.

Image data writing control performed by the CPU 81 of the engine control subunit 80 involves, for example, oscillation control of the semiconductor lasers of the LD(Bk) unit 50, LD(M) unit 51, LD(Y) unit 52 and LD(C) unit 53 in the exposing unit 19; and control of the polygon motor 65 based on signals detected by the first and second sync detection sensors 63 and 64.

Control of the photoreceptors 16Bk, 16M, 16C and 16Y performed by the CPU 81 of the engine control subunit 80 involves, for example, drive control of the photoreceptors 16Bk, 16M, 16C and 16Y; and voltage control of the charging units 17Bk, 17M, 17C and 17Y and the cleaner blades 18Bk, 18M, 18C and 18Y.

Control of the developing units 14Bk, 14M, 14C and 14Y performed by the CPU 81 of the engine control subunit 80 involves, for example, voltage control of the developing units 14Bk, 14M, 14C and 14Y, the supply rollers 13Bk, 13M, 13C and 13Y, and the developing blades 15Bk, 15M, 15C and 15Y, respectively.

Transfer control performed by the CPU 81 of the engine control subunit 80 involves, for example, voltage control of the primary transfer rollers 24Bk, 24M, 24C and 24Y at positions (primary transfer positions) where the transfer belt 10 comes in contact with the photoreceptors 16Bk, 16M, 16C and 16Y, respectively; and current control and voltage control of the secondary transfer roller 32 when a full-color toner image, formed on the transfer belt 10 by superposing toner images of individual colors and then carried to the secondary transfer roller 32, is transferred to a sheet of paper 26 sent out at such a timing that the full-color toner image on the transfer belt 10 is synchronized with the sheet of paper 26.

Paper feeding control performed by the CPU 81 of the engine control subunit 80 involves, for example, control of the resist rollers 31 so as to send out the sheet of paper 26 at such a timing that the full-color toner image on the transfer belt 10 is synchronized with the sheet of paper 26; and control of a motor, a clutch, a solenoid (not shown) and the like used for paper feeding.

Figure 8:
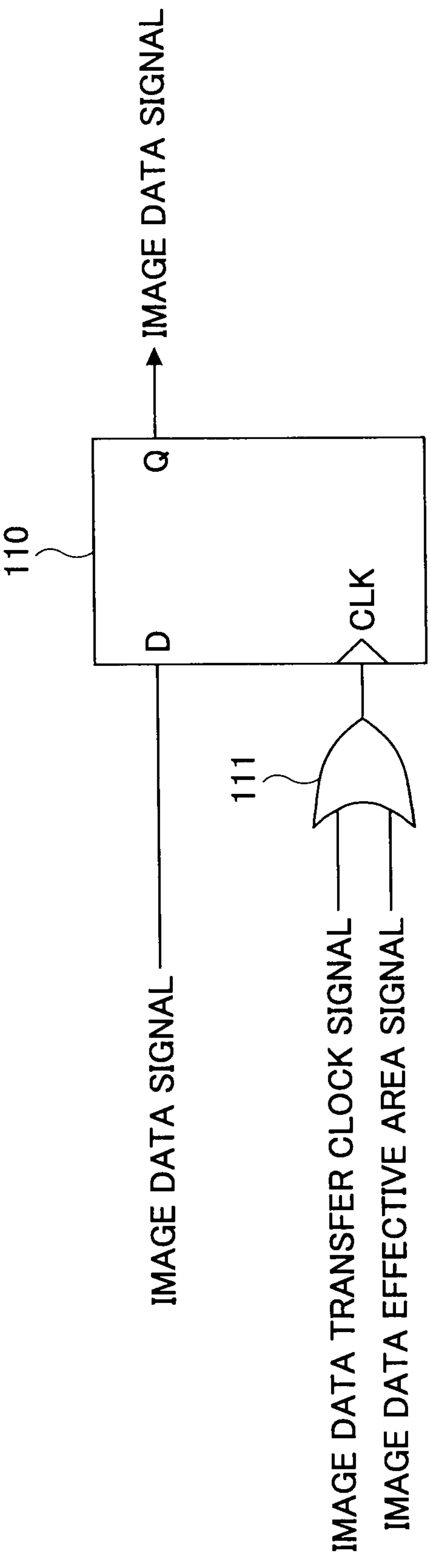
FIG. 8 is a block diagram showing a structure common to four receiving circuits provided in an input/output I/F of an engine control subunit of FIG. 5.

FIG. 8 is a block diagram showing a structure common to four receiving circuits provided in the input/output I/F 84 of the engine control subunit 80 of FIG. 5.

Each receiving circuit corresponds to a different one of the colors and receives a corresponding image data signal (i.e. Bk image data signal, M image data signal, C image data signal, or Y image data signal) from the controller subunit 70. Each receiving circuit includes a D flip-flop circuit 110 and an OR gate circuit 111.

The OR gate circuit 111 determines the level of voltage output to a CLK terminal of the D flip-flop circuit 110 based on voltage levels of the image data transfer clock signal and the image data effective area signal transmitted from the controller subunit 70.

When a rising edge signal indicating a level change from low to high is input to the CLK terminal from the OR gate circuit 111, the D flip-flop circuit 110 takes in image data of a corresponding color which has been transmitted to the D terminal from the controller subunit 70, and outputs the image data to an internal circuit. The image data are stored in the RAM 82.

Next is described a process for transmitting the image data effective area signal performed when the controller subunit 70 transmits image data of Bk, M, C and Y to the engine control subunit 80.

(1) First Example of Control Process

Figure 9:
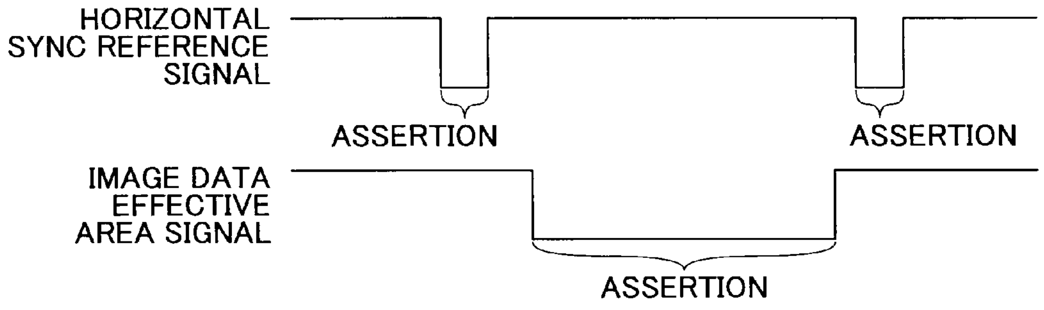
FIG. 9 is a timing chart showing transmission timing at which an image data effective area signal is transmitted by the controller subunit based on a horizontal sync reference signal.

FIG. 9 is a timing chart showing transmission timing at which the image data effective area signal is transmitted by the controller subunit 70 based on the horizontal sync reference signal.

When transmitting the image data of Bk, M, C and Y after generating them, the controller subunit 70 transmits the image data transfer clock signal (not shown in FIG. 9) to the engine control subunit 80 based on the horizontal sync reference signal received from the engine control subunit 80. As shown in FIG. 9, the horizontal sync reference signal is asserted by the engine control subunit 80 at regular intervals. In accordance with the horizontal sync reference signal, the controller subunit 70 asserts the image data effective area signal, which indicates an effective area of the image data to the engine control subunit 80, in such a manner that the assertion period of the image data effective area signal occurs between two consecutive assertion periods of the horizontal sync reference signal.

The controller subunit 70 transmits the image data to the engine control subunit 80 during the assertion period of the image data effective area signal.

Herewith, the engine control subunit 80 is able to readily determine an effective area for one line of the image data, and accordingly, it is possible to simplify the structure of each receiving circuit of the engine control subunit 80, as shown in FIG. 8.

In addition, since the effective area of the image data received is determined based on the image data effective area signal, the engine control subunit 80 is able to reduce the noise influence on the timing of transferring the image data, so that it is possible to form a high quality image at low cost.

(2) Second Example of Control Process

Figure 10:
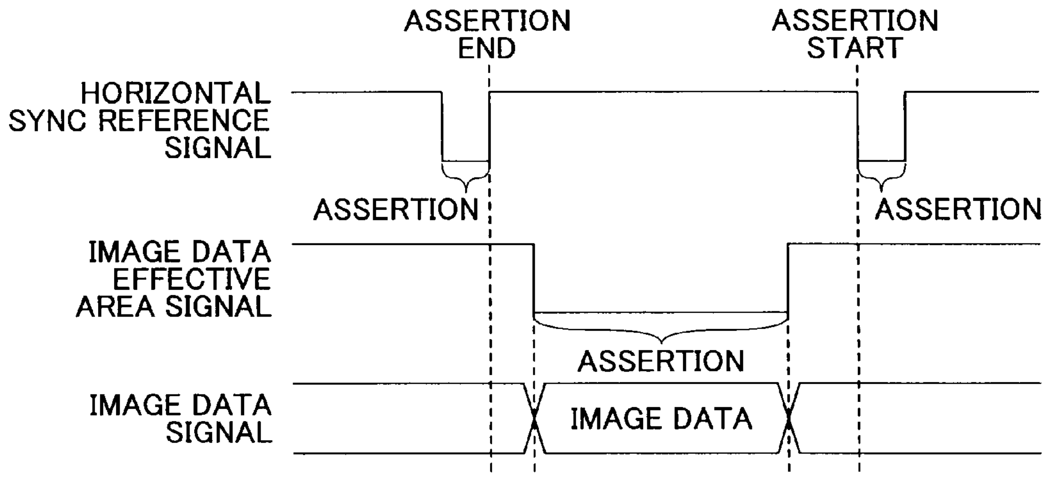
FIG. 10 is a timing chart showing another example of transmission timing at which the image data effective area signal is transmitted by the controller subunit based on the horizontal sync reference signal.

FIG. 10 is a timing chart showing another example of transmission timing at which the image data effective area signal is transmitted by the controller subunit 70 based on the horizontal sync reference signal.

When transmitting the image data of Bk, M, C and Y after generating them, the controller subunit 70 transmits the image data transfer clock signal (not shown in FIG. 10) to the engine control subunit 80 based on the horizontal sync reference signal received from the engine control subunit 80. As shown in FIG. 10, the horizontal sync reference signal is asserted by the engine control subunit 80 at regular intervals. In accordance with the horizontal sync reference signal, the controller subunit 70 asserts the image data effective area signal, which indicates an effective area of the image data to the engine control subunit 80, in such a manner that the assertion period of the image data effective area signal occurs between the end of the former assertion period ("assertion end" in FIG. 10) of two consecutive assertion periods and the start of the latter assertion period ("assertion start").

That is to say, the image data effective area signal is asserted after the horizontal sync reference signal is negated.

During the assertion period of the image data effective area signal, the controller subunit 70 transmits image data to the engine control subunit 80.

Herewith, even if noise voltage fluctuations occur during the assertion period of the horizontal sync reference signal, the image data effective area signal and the image data can be transmitted outside the assertion period of the horizontal sync reference signal when no noise voltage fluctuations occur. As a result, it is possible to prevent transmission timing of the image data from being accelerated or delayed due to noise influence.

(3) Third Example of Control Process

Figure 11:
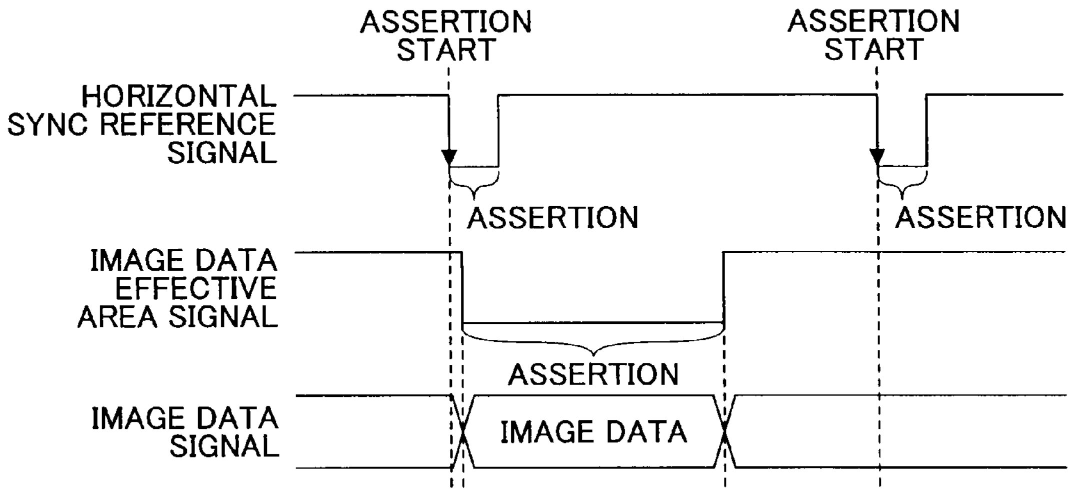
FIG. 11 is a timing chart showing yet another example of transmission timing at which the image data effective area signal is transmitted by the controller subunit based on the horizontal sync reference signal.

FIG. 11 is a timing chart showing yet another example of transmission timing at which the image data effective area signal is transmitted by the controller subunit 70 based on the horizontal sync reference signal.

When transmitting the image data of Bk, M, C and Y after generating them, the controller subunit 70 transmits the image data transfer clock signal (not shown in FIG. 11) to the engine control subunit 80 based on the horizontal sync reference signal received from the engine control subunit 80. As shown in FIG. 11, the horizontal sync reference signal is asserted by the engine control subunit 80 at regular intervals. In accordance with the horizontal sync reference signal, the controller subunit 70 asserts the image data effective area signal, which indicates an effective area of the image data to the engine control subunit 80, in such a manner that the assertion period of the image data effective area signal occurs between the falling edge of the former assertion period ("assertion start" in FIG. 11) of two consecutive assertion periods and the falling edge of the latter assertion period ("assertion start").

That is to say, the timing of the image data effective area signal being asserted is defined based on the falling edges of assertion periods of the horizontal sync reference signal, the assertion periods of which occur at regular intervals. More specifically, the image data effective area signal is asserted at the time when, or after, the horizontal sync reference signal is asserted.

During the assertion period of the image data effective area signal, the controller subunit 70 transmits the image data to the engine control subunit 80.

Herewith, it is possible to prevent timing of asserting the image data effective area signal from being accelerated or delayed due to a change in the length (duration) of the assertion periods of the horizontal sync reference signal. As a result, transmission of the image data effective area signal and the image data can be started with stable timing, which leads to a stable line velocity in the image forming process.

Next is described a control operation of the engine control subunit 80 performed when the image data of Bk, M, C and Y are received from the controller subunit 70.

(4) Fourth Example of Control Process

Figure 12:
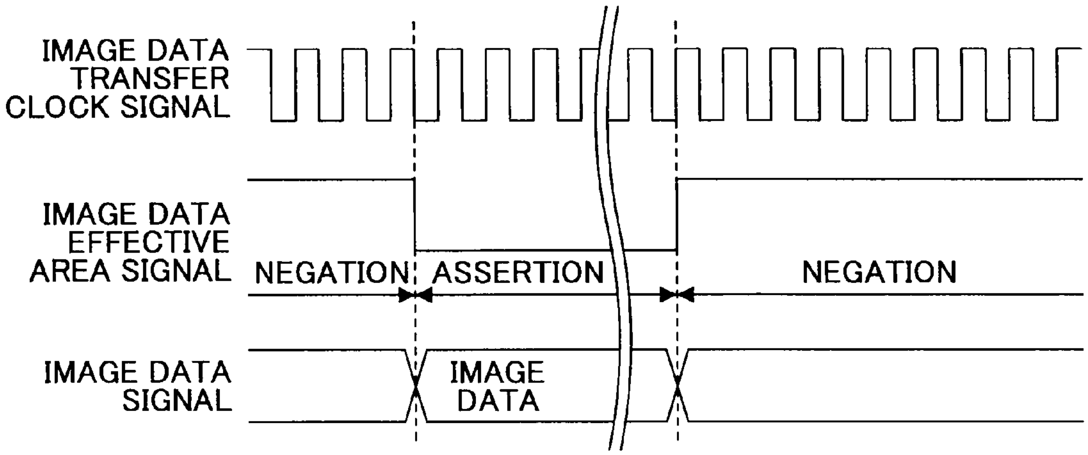
FIG. 12 is a timing chart showing timing of control operation of the engine control subunit of FIG. 5 performed at the time of receiving image data from the controller subunit.

FIG. 12 is a timing chart showing timing of the control operation of the engine control subunit 80 performed at the time of receiving the image data from the controller subunit 70.

When transmitting the image data of Bk, M, C and Y after generating them, the controller subunit 70 performs signal control based on the horizontal sync reference signal in accordance with one of the above-described examples (1) through (3).

On the other hand, the engine control subunit 80 transmits the horizontal sync reference signal to the controller subunit 70, and receives from the controller subunit 70 the image data transfer clock signal, the image data effective area signal and the image data shown in FIG. 12. Under this condition, the image data transmitted during negation periods of the image data effective area signal are regarded as invalid data, and the engine control subunit 80 performs control so as not to receive the image data during the negation periods of the image data effective area signal.

Herewith, validity and invalidity of the image data can be determined using a single signal line only, which results in a reduction of processing workload associated with the timing control for the image data reception.

In addition, since the image data transmitted during periods when the image data effective area signal is negated are regarded as invalid data, a high quality image can be readily formed using such simplified receiving circuits.

Next is described a control operation of the controller subunit 70 performed when the image data of Bk, M, C and Y are transmitted to the engine control subunit 80.

(5) Fifth Example of Control Process

Figure 13:
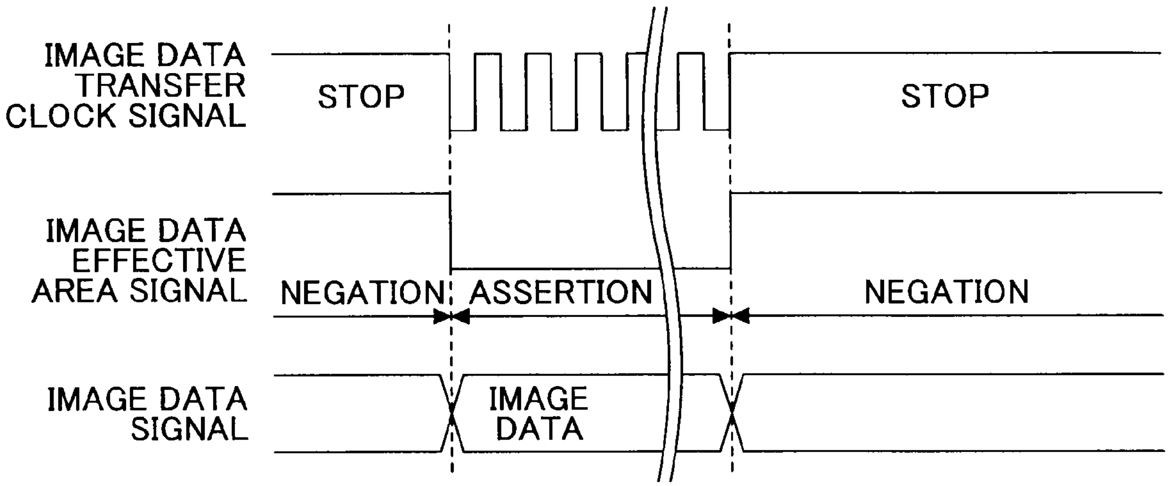
FIG. 13 is a timing chart showing timing of control operation of the controller subunit of FIG. 5 performed at the time of transmitting the image data to the engine control subunit.

FIG. 13 is a timing chart showing timing of the control operation of the controller subunit 70 performed at the time of transmitting image data to the engine control subunit 80.

When transmitting the image data of Bk, M, C and Y after generating them, the controller subunit 70 performs, in addition to transmission control of other signals, transmission control of the image data transfer clock signal, which indicates transmission timing of each bit of the image data, when the image data are transmitted based on the horizontal sync reference signal in accordance with one of the above-described examples (1) through (3). As illustrated in FIG. 13, during the periods when the image data effective area signal is negated (the signal level is either high "H" or low "L"), the controller subunit 70 stops transmission of the image data transfer clock signal to the engine control subunit 80.

Herewith, it is possible to reduce (eliminate) fluctuations in the voltage level of the image data transfer clock signal in the communication line 90 of FIG. 5 as well as the total energy of unwanted radiating noise due to the receiving circuits of FIG. 8 being in operation. As a result, countermeasures against electromagnetic interference (EMI) can be simplified, which enables providing an inexpensive structure for achieving high quality image formation.

Next is described another control operation of the controller subunit 70 performed when the image data are transmitted to the engine control subunit 80.

(6) Sixth Example of Control Process

Figure 14:
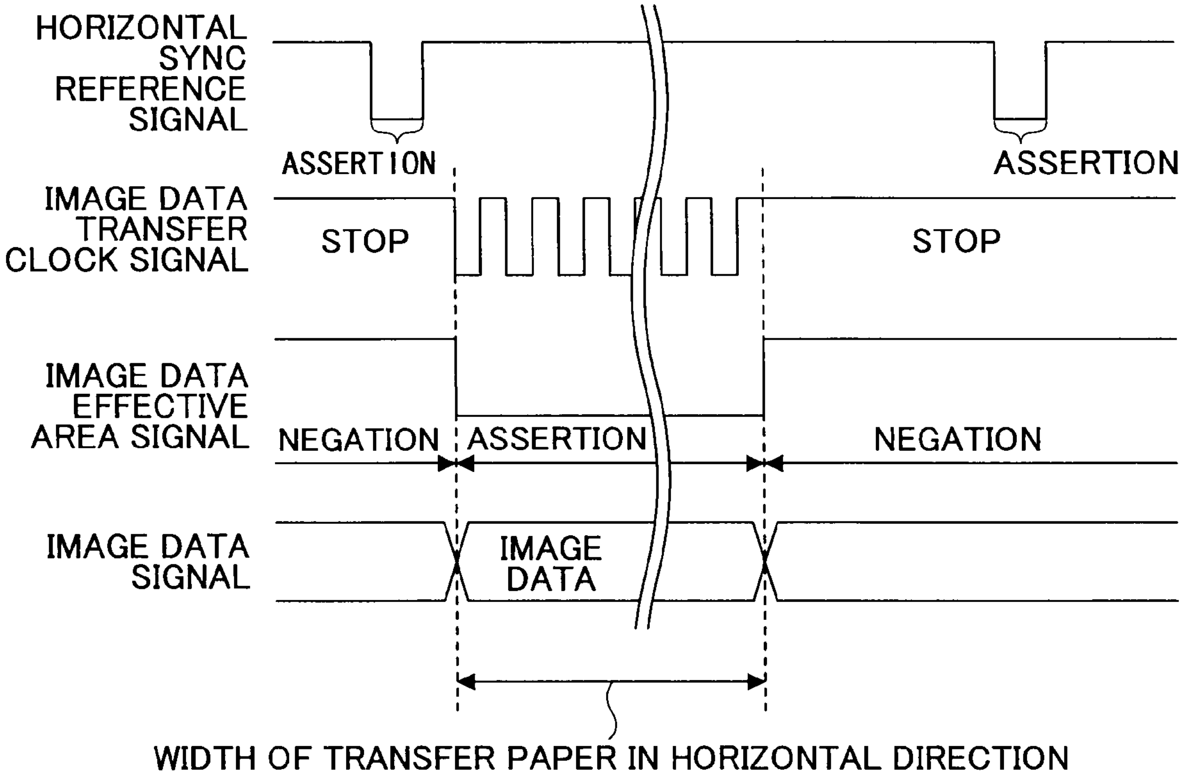
FIG. 14 is a timing chart showing timing of another control operation of the controller subunit performed at the time of transmitting image data to the engine control subunit.

FIG. 14 is a timing chart showing timing of another control operation of the controller subunit 70 performed at the time of transmitting image data to the engine control subunit 80.

When transmitting the image data of Bk, M, C and Y after generating them, the controller subunit 70 performs, in addition to transmission control of other signals, transmission control of the image data transfer clock signal, which indicates transmission timing of each bit of the image data, when the image data are transmitted based on the horizontal sync reference signal in accordance with one of the above-described examples (1) through (3).

As shown in FIG. 14, the horizontal sync reference signal is asserted by the engine control subunit 80 via the communication line 90 at regular intervals. In accordance with the horizontal sync reference signal, the controller subunit 70 asserts the image data effective area signal, which indicates an effective area of the image data to the engine control subunit 80, in such a manner that the assertion period of the image data effective area signal occurs between two consecutive assertion periods of the horizontal sync reference signal. As illustrated in FIG. 14, the controller subunit 70 stops transmission of the image data transfer clock signal to the engine control subunit 80 during a negation period of the image data effective area signal prior to an assertion period of the image data effective area signal. The controller subunit 70 then transmits the image data transfer clock signal during the assertion period of the image data effective area signal, and subsequently stops transmission of the image data transfer clock signal when the image data effective area signal is again negated after the assertion.

Also with reference to FIG. 14, the controller subunit 70 negates the image data effective area signal during the periods when the image data transfer clock signal is stopped, and asserts it during the periods when the image data transfer clock signal is transmitted.

In this case, the controller subunit 70 transmits the image data effective area signal in such a manner that the length of each assertion period of the image data effective area signal corresponding to one line of the image data becomes the same as the width of transfer paper (the sheet of paper 26) in a horizontal direction.

Accordingly, as depicted in FIG. 14, the image data signal corresponding to the whole area of the transfer paper is output.

Herewith, the whole area of the transfer paper (the origin is located at the top corner of the transfer paper) becomes the effective area of the image data. Accordingly, position information of the image data effective origin (the coordinate is zero) transmitted from the controller subunit 70 to the engine control subunit 80 can be checked based on assertion periods of the horizontal sync reference signal, the image data effective area signal and the vertical image effective area signal. As a result, it is possible to simplify the interface (I/F) specification between the controller subunit 70 and the engine control subunit 80.

Next is described yet another control operation performed when the image data are transmitted and received between the controller subunit 70 and the engine control subunit 80.

(7) Seventh Example of Control Process

The seventh example of the control process uses four receiving circuits in the input/output I/F 84, each of which has a different structure from that illustrated in FIG. 8.

Figure 15:
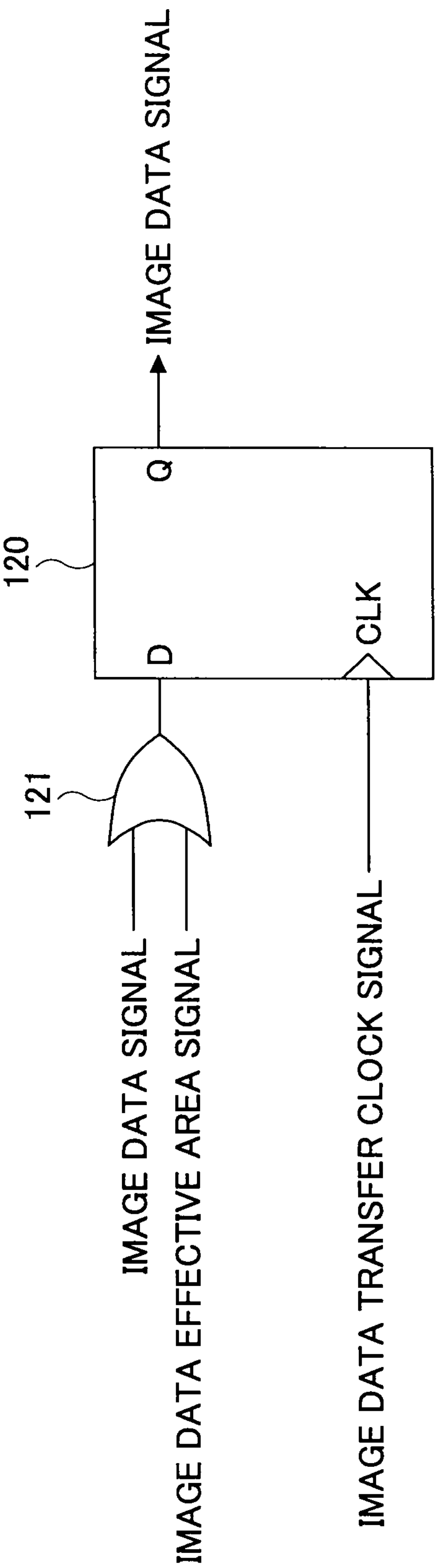
FIG. 15 is a block diagram showing another structure common to four receiving circuits provided in the input/output I/F of the engine control subunit of FIG. 5.

FIG. 15 is a block diagram showing another structure common to four receiving circuits provided in the input/output I/F 84 of the engine control subunit 80 of FIG. 5.

Each receiving circuit corresponds to a different one of the colors and receives a corresponding image data signal (i.e. Bk image data signal, M image data signal, C image data signal, or Y image data signal) from the controller subunit 70. Each receiving circuit includes a D flip-flop circuit 120 and an OR gate circuit 121.

When the image data transfer clock signal transmitted from the controller subunit 70 is input to the CLK terminal, the D flip-flop circuit 120 takes in image data of a corresponding color transmitted from the controller subunit 70 and input to the D terminal via the OR gate circuit 121, and outputs the image data to an internal circuit. In this situation, the engine control subunit 80 regards, as valid, the image data received during the periods in which the image data effective area signal is asserted, and outputs the image data. On the other hand, the engine control subunit 80 regards, as image data to be deleted, the image data received during the periods in which the image data effective area signal is negated, and outputs blank image data. The image data is stored in the RAM 82.

Figure 16:
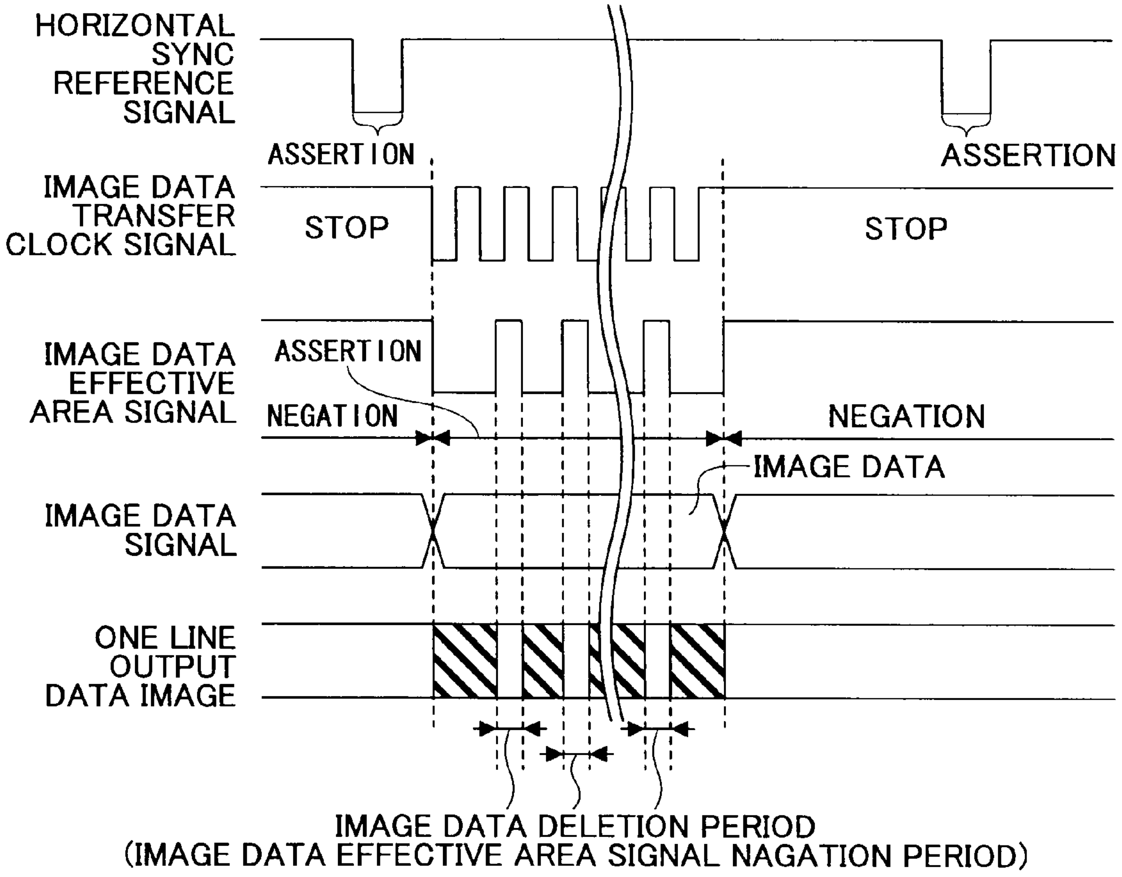
FIG. 16 is a timing chart showing timing of yet another control operation performed when the image data are transmitted and received between the controller subunit and the engine control subunit.

FIG. 16 is a timing chart showing timing of yet another control operation performed when the image data are transmitted and received between the controller subunit 70 and the engine control subunit 80.

In the seventh example of the control process, the controller subunit 70 generates and transmits the image data of Bk, M, C and Y in the same manner described in the sixth example. However, as shown in FIG. 16, when transmitting the image data to the engine control subunit 80, the controller subunit 70 negates the image data effective area signal during periods corresponding to portions of the image data that are desired to be deleted.

On the other hand, the engine control subunit 80 regards, as invalid, the image data received during the periods in which the image data effective area signal is negated, and outputs blank image data so as to delete the invalid image data using the receiving circuits of FIG. 15. As indicated by the shaded areas in FIG. 16, the engine control subunit 80 outputs the image data during the assertion periods of the image data effective area signal.

Since blank image data is output during periods in which the image data transfer clock signal is input and the image data effective area signal is negated in order to delete the intended portions of the image data (the periods are indicated as "image data deletion periods" in FIG. 16), it is possible to extract or delete an intended portion of the image data.

Thus, based on a predetermined length and a predetermined number of the assertion periods of the image data effective area signals, an effective area(s) of the image data can be specified within each period during which one line of the image data is being output. As a result, it is possible to readily achieve, in image forming control operations, a function of extracting or deleting an intended portion(s) of the image data.

Next is described yet another control operation of the controller subunit 70 performed when the image data are transmitted to the engine control subunit 80.

(8) Eighth Example of Control Process

Figure 17:
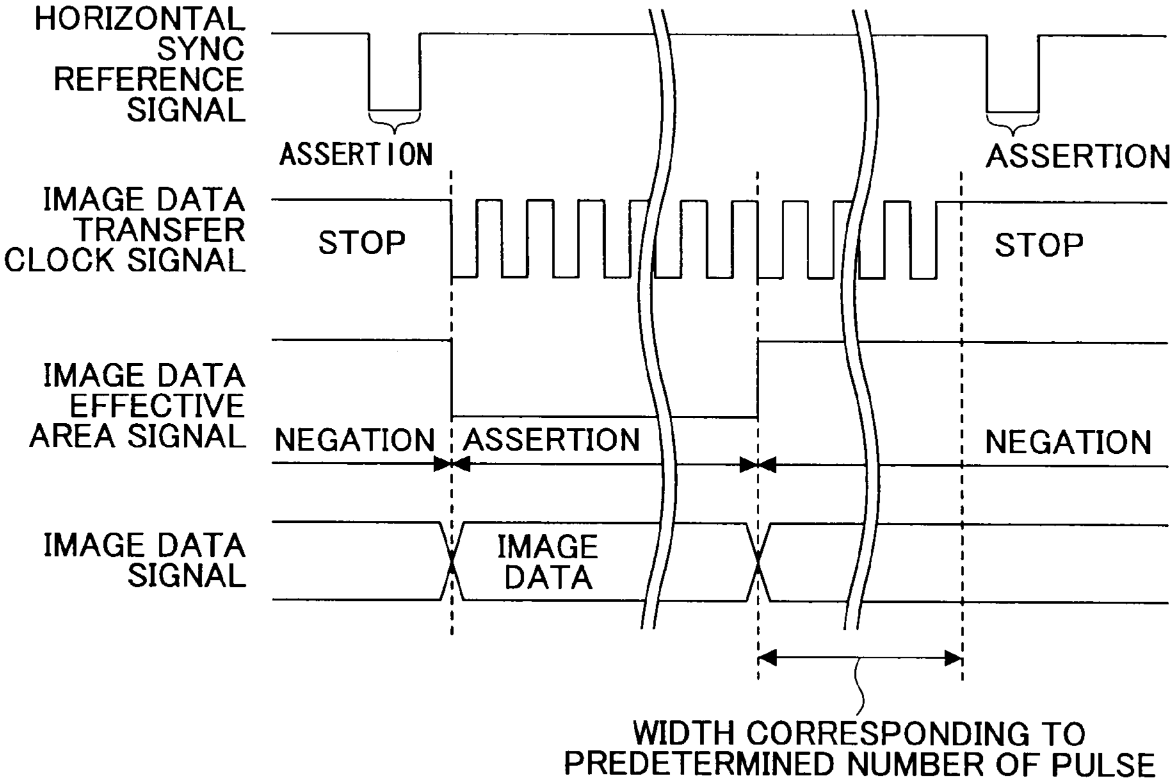
FIG. 17 is a timing chart showing timing of yet another control operation of the controller subunit performed at the time of transmitting image data to the engine control subunit.

FIG. 17 is a timing chart showing timing of yet another control operation of the controller subunit 70 performed at the time of transmitting image data to the engine control subunit 80.

When transmitting the image data of Bk, M, C and Y after generating them, the controller subunit 70 performs, in addition to transmission control of other signals, transmission control of the image data transfer clock signal, which indicates transmission timing of each bit of the image data, when the image data are transmitted based on the horizontal sync reference signal in accordance with one of the above-described examples (1) through (3).

As shown in FIG. 17, the horizontal sync reference signal is asserted by the engine control subunit 80 via the communication line 90 at regular intervals. In accordance with the horizontal sync reference signal, the controller subunit 70 asserts the image data effective area signal, which indicates an effective area of the image data to the engine control subunit 80, in such a manner that the assertion period of the image data effective area signal occurs between two consecutive assertion periods of the horizontal sync reference signal. As illustrated in FIG. 17, the controller subunit 70 stops transmission of the image data transfer clock signal to the engine control subunit 80 during a negation period of the image data effective area signal prior to an assertion period of the image data effective area signal. The controller subunit 70 then transmits the image data transfer clock signal during the assertion period of the image data effective area signal. Subsequently, when the image data effective area signal is again negated after the assertion, the controller subunit 70 outputs the image data transfer clock signal to the engine control subunit 80 additionally for a period corresponding to a predetermined number of pulses before stopping the transmission of the image data transfer clock signal.

If the engine control subunit 80 is configured to use the additionally output image data transfer clock signal in a process for storing received data in the RAM and a data processing operation, it is possible to simplify circuits of the control unit in the control board box 38 as well as control of the circuits, which results in producing the image forming apparatus at low cost.

The control device and image forming apparatus according to the present invention are applicable to general-purpose apparatuses handling color images, such as fax machines, printers, and multifunction peripherals providing multiple functions of such machines.

This application is based on Japanese Patent Application No. 2007-333957 filed on Dec. 26, 2007 and No. 2008-157882 filed on Jun. 17, 2008, the contents of which are hereby incorporated herein by reference.

What is claimed is:

1. A control device comprising:

a first control unit configured to generate image data of a plurality of images to be superposed one on the other to form a single image and transmit the image data; and a second control unit configured to receive the image data and superpose the images so as to form the single image;

wherein the second control unit transmits to the first control unit a horizontal sync reference signal for achieving synchronization of the images in a horizontal direction, based on the horizontal sync reference signal, the first control unit transmits to the second control unit a transfer clock signal that indicates transmission timing of the image data and an effective area signal that indicates an effective area of the image data, and the first control unit asserts the effective area signal for an effective-area-signal assertion period that occurs between two consecutive reference-signal assertion periods during which the horizontal sync reference signal is asserted;

wherein the first control unit stops the transmission of the transfer clock signal during an effective-area-signal negation period, during which the effective area signal is negated, prior to the effective-area-signal assertion period; the first control unit then transmits the transfer clock signal during the effective-area-signal assertion period; and when the effective area signal is negated again after the effective-area-signal assertion period, the first control unit keeps the transmission of the transfer clock signal for a period corresponding to a predetermined number of pulses of the transfer clock signal, before stopping the transmission of the transfer clock signal.

2. The control device as claimed in claim 1, wherein the first control unit asserts the effective area signal for the effective-area signal assertion period that occurs between an end of a former of the two reference-signal assertion periods and a start of a latter of the two reference-signal assertion periods.

3. The control device as claimed in claim 1, wherein the first control unit asserts the effective area signal in such a manner that the effective-area signal assertion period occurs between a falling edge of a former of the two reference-signal assertion periods and a falling edge of a latter of the two reference-signal assertion periods.

4. The control device as claimed in claim 1, wherein the second control unit regards, as invalid, the image data received during a period in which the effective area signal is negated.

5. The control device as claimed in claim 1, wherein the first control unit stops transmitting the transfer clock signal to the second control unit during a period in which the effective area signal is negated.

6. The control device as claimed in claim 1, wherein the first control unit stops the transmission of the transfer clock signal during an effective-area-signal negation period, during which the effective area signal is negated, prior to the effective-area-signal assertion period; the first control unit then transmits the transfer clock signal during the effective-area-signal assertion period; and when the effective area signal is negated again after the effective-area-signal assertion period, the first control unit keeps the transmission of the transfer clock signal for a period corresponding to a predetermined number of pulses of the transfer clock signal, before stopping the transmission of the transfer clock signal.

7. The control device as claimed in claim 1, wherein the first control unit negates the effective area signal during a period corresponding to a portion of the image data desired to be deleted, and the second control unit regards as invalid and deletes the image data received during a period in which the effective area signal is negated.

8. The control device as claimed in claim 1, wherein a duration of the effective-area-signal assertion period corresponds to a horizontal-direction width of transfer paper on which the single image is formed.

9. An image forming apparatus comprising a control device that includes:

a first control unit configured to generate image data of a plurality of images to be superposed one on the other to form a single image and transmit the image data; and a second control unit configured to receive the image data and superpose the images so as to form the single image;

wherein the second control unit transmits to the first control unit a horizontal sync reference signal for achieving synchronization of the images in a horizontal direction, based on the horizontal sync reference signal, the first control unit transmits to the second control unit a transfer clock signal that indicates transmission timing of the image data and an effective area signal that indicates an effective area of the image data, and the first control unit asserts the effective area signal for an effective-area-signal assertion period that occurs between two consecutive reference-signal assertion periods during which the horizontal sync reference signal is asserted;

wherein the first control unit stops the transmission of the transfer clock signal during an effective-area-signal negation period, during which the effective area signal is negated, prior to the effective-area-signal assertion period; the first control unit then transmits the transfer clock signal during the effective-area-signal assertion period; and when the effective area signal is negated again after the effective-area-signal assertion period, the first control unit keeps the transmission of the transfer clock signal for a period corresponding to a predetermined number of pulses of the transfer clock signal, before stopping the transmission of the transfer clock signal.

10. The image forming apparatus as claimed in claim 9, wherein the first control unit asserts the effective area signal for the effective-area signal assertion period that occurs between an end of a former of the two reference-signal assertion periods and a start of a latter of the two reference-signal assertion periods.

11. The image forming apparatus as claimed in claim 9, wherein the first control unit asserts the effective area signal for the effective-area signal assertion period that occurs between a falling edge of a former of the two reference-signal assertion periods and a falling edge of a latter of the two reference-signal assertion periods.

12. The image forming apparatus as claimed in claim 9, wherein the second control unit regards, as invalid, the image data received during a period in which the effective area signal is negated.

13. The image forming apparatus as claimed in claim 9, wherein the first control unit stops transmitting the transfer clock signal to the second control unit during a period in which the effective area signal is negated.

14. The image forming apparatus as claimed in claim 9, wherein the first control unit stops the transmission of the transfer clock signal during an effective-area-signal negation period, during which the effective area signal is negated, prior to the effective-area-signal assertion period; the first control unit then transmits the transfer clock signal during the effective-area-signal assertion period; and when the effective area signal is negated again after the effective-area-signal assertion period, the first control unit keeps the transmission of the transfer clock signal for a period corresponding to a predetermined number of pulses of the transfer clock signal, before stopping the transmission of the transfer clock signal.

15. The image forming apparatus as claimed in claim 9, wherein the first control unit negates the effective area signal during a period corresponding to a portion of the image data desired to be deleted, and the second control unit regards as invalid and deletes the image data received during a period in which the effective area signal is negated.

16. The image forming apparatus as claimed in claim 9, wherein a duration of the effective-area-signal assertion period corresponds to a horizontal-direction width of transfer paper on which the single image is formed.

* * * * *